W. CROW AND J. C. SCHAFFER.
QUICKLIME PRODUCTION.
APPLICATION FILED NOV. 13, 1917.
1,377,401.
Patented May 10, 1921.
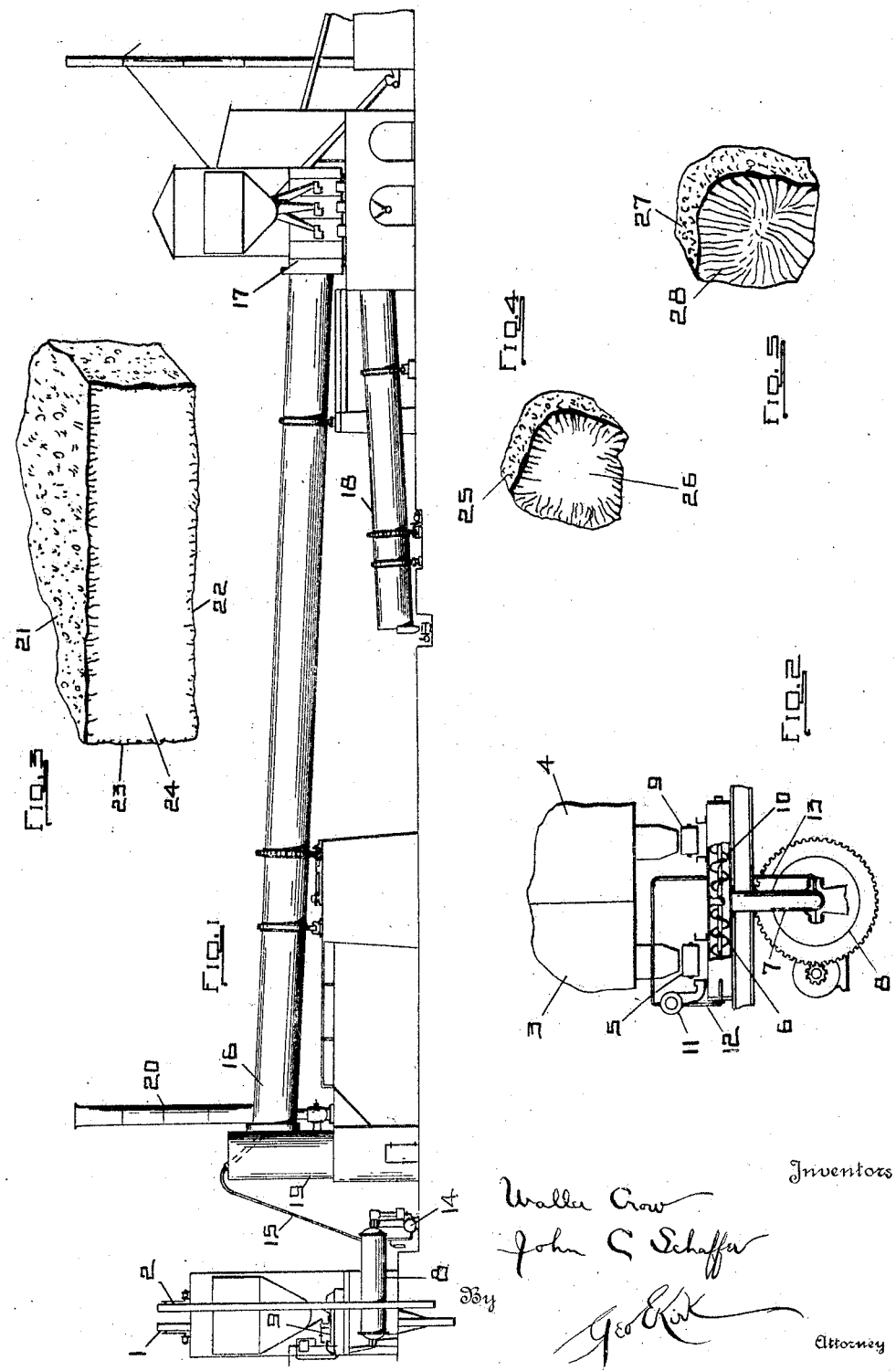

UNITED STATES PATENT OFFICE.

WALLER CROW AND JOHN C. SCHAFFER, OF TIFFIN, OHIO.

QUICKLIME PRODUCTION.

1,377,401.  Specification of Letters Patent.  Patented May 10, 1921.

Application filed November 13, 1917. Serial No. 201,821.

*To all whom it may concern:*

Be it known that we, WALLER CROW and JOHN C. SCHAFFER, each a citizen of the United States of America, residing at Tiffin, Seneca county, Ohio, have invented new and useful Quicklime Production, of which the following is a specification.

This invention relates to the removal of relatively more volatile portions of material. This invention has utility when adopted for the removal of a fluid from a substance, especially involving the release of the fluid from chemical union, as of carbon dioxid from carbonates, especially of the alkaline earths as calcium and magnesium carbonate rocks.

Referring to the drawings:

Figure 1 is a side elevation of an embodiment of the invention in a rotary kiln as for burning to an oxid calcium and magnesium carbonates;

Fig. 2 is a fragmentary end elevation of the supply apparatus;

Fig. 3 is a fragment of the caked material from the slurry;

Fig. 4 is a fragment of the nodule, showing the further stage or treatment, and

Fig. 5 is a fully seasoned or treated nodule fragment.

The elevators 1, 2, may supply respectively a substance to be treated, as limestone to the bin 3, and a plasticity producing material, as hydrated lime to the bin 4, which material is designed to cause agglutination of the small particles of limestone into discreet bodies. From the bin 3 the material to be treated is removed and weighed at a uniform rate by the conveyer 5 of a feeding device, say of the character shown in John C. Schaffer U. S. Letters Patent 1,059,005 of April 15, 1913, for delivery of material to the scroll conveyer 6 and from thence by the chute 7 to the tube mill 8. The material from the bin 4, also has its delivery rate definitely adjusted by a conveyer 9, similar to the conveyer 5. The conveyer 9 delivers the material handled thereby to the scroll conveyer 10, oppositely pitched to the conveyer 6 and on the same shaft for simultaneously discharging said material into the chute 7 and passing said material to the tube mill 8.

Connected to the adjustable feeding device 5 to run in synchronism therewith, is the piston and cylinder water measuring device 11, delivering liquid from the line 12 to pass by the line 13 into the tube mill 8 to make a thin paste or slurry of the various ingredients or components thoroughly commingled and uniformly subdivided in the mill.

This thin slurry, which may carry say 30% water, in passing from the mill 8 to the rotary pump 14 is conducted by the duct 15 to the feed or upper end of the rotary kiln 16 heated by the furnace 17 thereby supplying a moisture tempered or approximately a reducing heating gas extending throughout the cross section of the kiln 16 at its discharge end. The material from the kiln may pass for cooling to the rotary cooler 18.

The combustion gases or spent heating gases, the water and the dioxid from the slurry are removed and pass to the header 19 and thence are disposed of, as by the stack 20 or other means.

The rotary kiln of slow rotation, has its interior refractory walls where exposed heated, so that with the charge of slurry falling thereon at the higher or feeding end of the kiln 16, a driving of the moisture therefrom occurs to leave the solid of suspension as a caked material. This deposited mass of material, with the counter-current of gases thereover has its upper or exposed surface also acted upon. These two direct and radiant sources coact to an extent that in the kiln rotation, the drying mass may progress by falling forward, due to the incline of the kiln.

This fallen mass or fragment ruptures or subdivides, say to form a body as shown in Fig. 3 having the more thoroughly seasoned or what was the upper surface 21, the slightly less seasoned or dried lower surface 22 and the fractures 23 from which the moisture has just started to be driven or extracted. The interior 24 is fully charged with the gases to be removed. Continued slow rotation effects a tumbling progress downward in the kiln away from the charging end, with a slow extraction of the gases by this gas extracting heat. The moisture gathered mass is thus transformed into porous nodules, and this nodulization has increased the volatilization area over a nonporous nodule or broken stone formation, and herein occurred during the rolling of the mass in the rotary kiln for nodulization thereof.

The continued extraction and tumbling effects a more or less uniform production of particles or nodules, which depending upon the character of the material, may be such as would pass through say a three quarter inch screen. Such a particle, shown with a section taken therefrom in Fig. 4, has its bounding faces 25 seasoned, or approximating a semi-porous state, retaining a definite form with an interior section still charged. This gradual seasoning or tempering-like is carried to full extraction as shown in Fig. 5 with the somewhat more open but still definitely formed faces 27 and the permeated interior 28 as shown on the section of this nodule.

This continuous or progressive treatment in a reducing heat from the furnace 17, due to the gradual rise in temperature throughout the kiln length in a range say approximating 1800° F. at the discharge end of the kiln 16, to a temperature of 500° F. at the feeding end of the kiln 16, insures superior quick lime product with utilization of the entire run of sizes of stone quarried. The cross sectional volume of the heated gases may extend the combustion region into the kiln from the furnace for reducing action in removing the more obstinate hydrate or water portions and in such withdrawal there is not charring or black residue, but a driving off of the carbon dioxid which has an affinity for water. This affinity of the carbon dioxid for water is really a formation of carbonic acid gas as the vapor bath or atmosphere enveloping the tumbling nodules. As the temperature is higher toward the discharge end, the atmosphere in the kiln has been one of gradually increasing tempering action. Accordingly at the relatively low temperature of the material feeding or upper end of the kiln, there is moisture extraction. At the intermediate kiln portions this extraction is coincident with or merges into the carbon dioxid extraction at such a rate that the nodules as units persist as porous lumps rendering possible uniform gas removal therefrom. With the temperatures below excessive or deleterious burning points, superior uniform grade of quick lime for mortar or finish material is produced. The particles are all relatively small, are all uniformly tumbled throughout the kiln with entire absence of any congesting at any time, even during a rotation. The extended exposed surfaces for action, with the tumbling insuring presentation of all faces of such area during each rotation or progress step, permit of rapid production with absolutely no loss in handling. The production rate on a one hundred seventy-five foot kiln may according to the material, run say from eight to twelve tons per hour. The charging of the kiln would be of the material running possibly under one third diameter of kiln depth therein so that in rotation it would fall forward just after passing the middle point in its rise with the kiln rotation. This variation in materials determines the speed rate for the kiln, while the extent of the burning or calcining for rendering the substance quick, is also a factor. Northwestern Ohio limestones are found to produce nodules having angle of repose approximating 30°.

The commingling or mixing of the charge, if the material itself in its mastic state will not properly form, is insured by the use of a plasticity material, which may be refuse sweepings or some alkali hydrate as may be more readily available or as may be desirable in standardizing the product.

The effective thorough burning as herein disclosed has the speed and superior product with use of all the stone, but these do not stop here, for the hydration may be most easily effected, even direct without any sorting or grinding, and the resultant product will take up as much as 25% more moisture than usual from hydrates shaft kiln burned and slacked. This added moisture carrying quality means that the entire mass is the real water taking variety and its great smoothness for wall application and its absence of check after applied, argue additionally to sustain the advance in the art as herein disclosed. The utilization of the fines and rejects, so acceptable herein may be a saving usually covering the grinding cost, and the economy in labor and capacity of output for compact installation are added savings.

What is claimed and it is desired to secure by Letters Patent is:

1. The method of burning to an oxid a lime containing material associated with plasticity producing means, including continuously agitating the material and subjecting to a gradually increasing tempered heat during such agitation.

2. The method of burning a lime containing material to render it susceptible to hydration, including progressing the material associated with plasticity producing means, and subjecting the progressing material to a gradually increasing tempered heating in a range from approximately 500° to and including 1500° F.

3. The method of rendering an alkali earth containing material susceptible to hydration including caking the material in association with a plasticity producing substance, and tumbling the caked material for subdividing and thorough agitation during a progressive travel against a countercurrent of gas extracting heat.

4. The method of driving carbon dioxid from a moist alkaline base containing material including, before driving off the carbon dioxid the step of subjecting the alkaline base containing moist material in association with a plasticity producing substance, to a moist heat of a temperature for removal of moisture below the temperature for carbon dioxid removal.

5. The method of extracting carbon dioxid from carbonates including moistening the carbonate in association with a hydrate to form a slurry, caking the slurry, gradually heating during agitation for slowly driving off the moisture in producing a porous nodular product from the cake, and then subjecting to a higher heat to drive off the carbon dioxid from the nodules.

6. The method of treating carbon dioxid containing alkaline earth containing material for extracting carbon dioxid therefrom, including subdividing the material in association with lime hydrate, and subjecting the material to gradually increasing heat, thereby producing porous nodules.

7. The method of increasing the volatilization area of a substance for the extraction of a gas therefrom, comprising the subdividing thereof, associating with a plasticity producing substance, and introduction thereof as a moist mass, rolling such mass for nodulization thereof in a gradually increasing heat, and slowly extracting the moisture to produce a porous nodulization of the moisture gathered material for rendering susceptible to hydration.

8. The method of extracting carbon dioxid from carbonates including the carrying of a moist carbon dioxid bath over an agitated moist mass of the carbonate associated with a plasticity producing substance for gradually extracting moisture and then the dioxid therefrom.

9. The method of de-carbonating a limestone, including mingling the limestone with a lime hydrate, and progressing the mixture in a gradually increasing heat for effecting porous nodulization thereof.

10. The method of treating material to remove volatile portions therefrom including having it associated with a plasticity producing substance, moistening the material to form a thickened mass, subjecting to a tempering atmosphere of gradually increasing action during a continued agitation of the material, thereby effecting the formation of nodules or fragments, said agitation being continued in said tempering atmosphere for a seasoning gradual removal of volatile portions throughout the entire mass of the respective nodules as a continuous stage from the disappearance of the moisture to effective carbon dioxid removal.

11. The method of burning limestone embodying mixing with ground limestone, some lime hydrate and water to form a slurry, and rotary kiln heat treating the mixed slurry.

In witness whereof we affix our signatures.

WALLER CROW.
JOHN C. SCHAFFER.